Figures 1, 2:
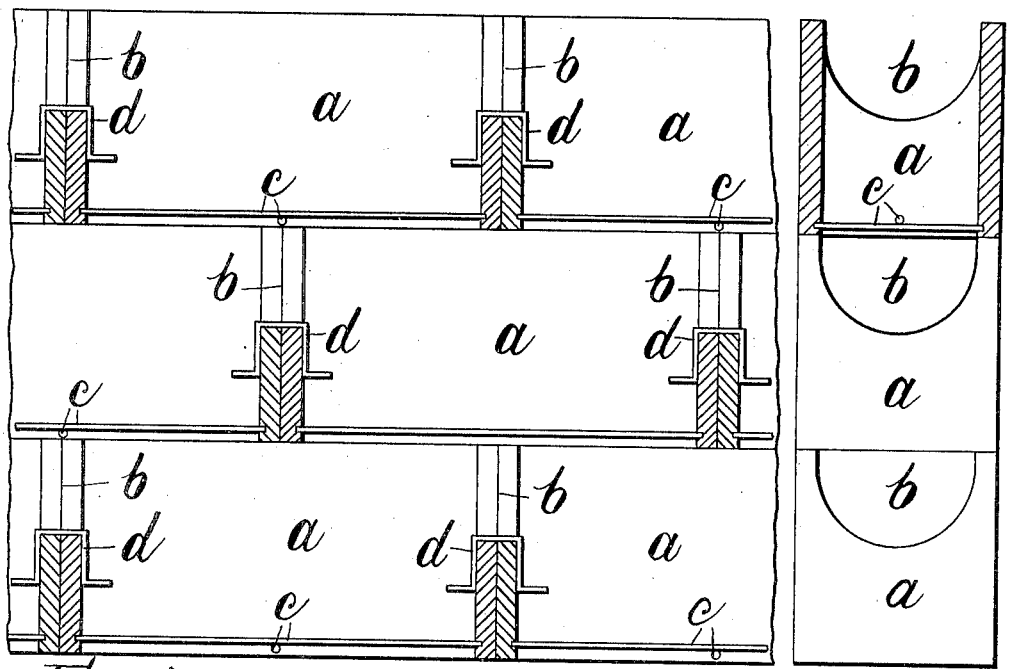

J. W. MOSELEY.
WALL CONSTRUCTION FOR HOUSES AND OTHER BUILDINGS.
APPLICATION FILED MAR. 11, 1912.

1,087,813. Patented Feb. 17, 1914.

Witnesses
C. Bean.
W. Allen

Inventor.
James W. Moseley.
by Herbert W. Jenner.
Attorney.

UNITED STATES PATENT OFFICE.

JAMES WARD MOSELEY, OF ROMILEY, ENGLAND.

WALL CONSTRUCTION FOR HOUSES AND OTHER BUILDINGS.

1,087,813.  Specification of Letters Patent.  Patented Feb. 17, 1914.

Application filed March 11, 1912.  Serial No. 683,059.

*To all whom it may concern:*

Be it known that I, JAMES WARD MOSELEY, subject of the King of Great Britain and Ireland, and resident of Romiley, in the county of Chester, England, land agent and surveyor, have invented certain new and useful Improvements in Wall Constructions for Houses and other Buildings, of which the following is a specification.

My invention relates to improvements in the construction of walls and similar structures, the object being to provide an improved construction of wall in concrete or like material which can be molded into hollow formation in separate blocks and the hollow spaces be afterward filled in by concrete rubble or waste material capable of setting into hard formation.

Prior to the date of my invention it has been a very common practice to build concrete and like structures from solid or partially hollow blocks of concrete, Portland cement and other material capable of setting hard, such blocks being usually bonded in the same way as stone and brick structures. It has also during recent years been common practice to erect structures from materials similar to those referred to, in conjunction with metal rods and known as reinforced concrete construction. In this latter arrangement it is necessary to provide shuttering which consists of planks or boards erected with the required shape and size of space between them to correspond with the wall, pillar or the like to be made, the concrete or cement material being filled in between the shuttering in a wet condition. The shuttering is afterward removed when the material has set. It is obvious that a construction of this type involves great expense in the shuttering itself and in its erection. Rich liquid cement is also lost through the joints of the shuttering and is likewise absorbed in the latter.

My invention is designed to provide an improved form of construction over those hereinbefore referred to which dispenses with shuttering, prevents the loss of liquid cement and consists in the employment of hollow troughs of suitable shape adapted to be laid end to end and to be placed one above the other in any required form of bond, the troughs being quite open at the top and partially at the ends while their bottom sides are perforated, such troughs being employed with reinforcing rods, if required. A further feature is the making of the troughs in separate parts and employing in conjunction with them specially arranged tiles or the like which may be adapted to form with one side of the combined troughs, an air cavity if required.

My invention will be fully described with reference to the accompanying drawings in which, Figure 1 is a longitudinal section of a portion of a wall constructed in accordance with my invention, Fig. 2 end elevation of same, partly in section, Fig. 3 perspective view of a portion of a wall partly in section.

Figure 3:
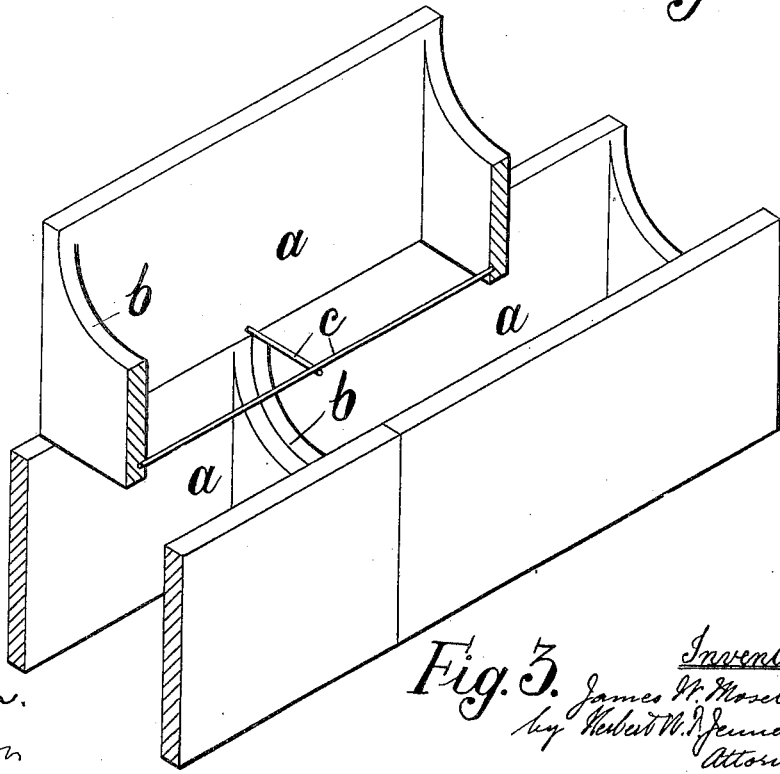

In accordance with my invention and with special reference to Figs. 1 to 3, $a$ indicates a number of hollow troughs quite open at the top and partially open at the ends as indicated at $b$ and also provided with perforated bottoms which in the example shown is indicated by longitudinal and transverse rods $c$ which are permanently secured to the body of the trough during the manufacture of the latter, though it will be understood that the perforated bottoms may be made of similar material molded with the sides and ends. The troughs are usually rectangular in construction but may be of any suitable shape and size and be perfectly plain, as shown, or be ornamented where necessary, in accordance with the character of the structure to be built. The troughs may be laid in any suitable bonding, one row being fixed at a time. The troughs are previously molded and dried so that they are in the latter condition when the structure is commenced and are made of Portland cement, concrete or the like material which will set hard. Or are made of material capable of being fired to a hard condition. The rods $c$ may be of expanded metal. When the troughs are laid in position end to end, cement grouting or like material is poured into the troughs and allowed to set. The troughs may be held together end to end by metal ties $d$, if required. The ends of such ties may project inwardly as shown in Fig. 1 so as to become embedded in the cement or other grouting or in the other filling material which may be employed and which may consist of broken bricks, stone, breeze and the like mixed with cement, so binding the troughs and filling into one solid mass. The foregoing process is repeated with each row of troughs employed in the structure.

What I claim is:

1. In a wall, a series of hollow trough-shaped building blocks arranged end to end in rows, and one above another so as to break joint and permit the introduction of filling material, each block being open at the top and having imperforate front and rear sides, ends having openings, and rods or bars which extend between the bottom portions of the blocks and permit the filling material to descend from the upper to the lower blocks.

2. In a wall, a series of hollow trough-shaped building blocks arranged end to end in rows, and one above another so as to break joint and permit the introduction of filling material, each block being open at the top and having imperforate front and rear sides, ends having openings at their upper parts, and rods which have their end portions embedded in the blocks and which extend between the bottom portions of the sides and ends of the blocks and permit the filling material to descend from the upper to the lower blocks.

In testimony whereof I have hereunto set my hand in the presence of two witnesses.

JAMES WARD MOSELEY.

Witnesses:
WILLIAM HENRY TAYLOR,
AMY EVELINE EVINS.

Copies of this patent may be obtained for five cents each, by addressing the "Commissioner of Patents, Washington, D. C."